United States Patent
Brenner

(10) Patent No.: US 8,094,064 B2
(45) Date of Patent: Jan. 10, 2012

(54) GROUND-BASED SYSTEM AND METHOD TO MONITOR FOR EXCESSIVE DELAY GRADIENTS

(75) Inventor: Mats A. Brenner, Plymouth, MN (US)

(73) Assignee: Honeywell International Inc., Morristown, NJ (US)

(*) Notice: Subject to any disclaimer, the term of this patent is extended or adjusted under 35 U.S.C. 154(b) by 168 days.

(21) Appl. No.: 12/717,254

(22) Filed: Mar. 4, 2010

(65) Prior Publication Data

US 2011/0215965 A1    Sep. 8, 2011

(51) Int. Cl.
    *G01S 19/43* (2010.01)
(52) U.S. Cl. .................................. 342/357.26
(58) Field of Classification Search .......... 342/357.26
    See application file for complete search history.

(56) References Cited

U.S. PATENT DOCUMENTS

| | | | |
|---|---|---|---|
| 5,041,833 A | 8/1991 | Weinberg | |
| 5,477,458 A | 12/1995 | Loomis | |
| 6,603,426 B1 | 8/2003 | Clark | |
| 6,674,398 B2 | 1/2004 | Murphy | |
| 6,859,690 B2 | 2/2005 | Asher et al. | |
| 7,089,452 B2 | 8/2006 | Rubin et al. | |
| 7,095,369 B1 | 8/2006 | Clark | |
| 7,310,062 B1 * | 12/2007 | Hwang | 342/357.59 |
| 7,477,183 B2 | 1/2009 | Watson et al. | |
| 7,548,196 B2 | 6/2009 | Fagan et al. | |
| 2005/0146461 A1 | 7/2005 | Pande et al. | |
| 2006/0047413 A1 | 3/2006 | Lopez et al. | |
| 2006/0273953 A1 | 12/2006 | Watson et al. | |
| 2009/0262013 A1 | 10/2009 | Vollath | |

FOREIGN PATENT DOCUMENTS

WO     2009103745     8/2009

OTHER PUBLICATIONS

Gratton et al., "Experimental Observations and Integrity Monitor Applications of LAAS IMLA Carrier Phase Measurements", Sep. 21-24, 2004, Publisher: ION GNSS 17th International Technical Meeting of the Satellite Division, Published in: Long Beach, CA.

\* cited by examiner

*Primary Examiner* — Harry Liu
(74) *Attorney, Agent, or Firm* — Fogg & Powers LLC

(57) ABSTRACT

A processing function to monitor a horizontal delay gradient in satellite signals is provided. The processing function includes a satellite differencing module, a double differencing module, and a gradient estimator module. The satellite differencing module receives carrier phase measurements for at least two satellites from at least two reference receivers that have a known geometric relationship to each other. The satellites include a monitored satellite and at least one other satellite. The satellite differencing module determines differences in the carrier phase measurements between signals from the monitored satellite and at least one other satellite. The double differencing module forms double-differences between pairs of the at least two reference receivers; compensates the double-differences between the pairs for the known difference-in-position of the reference receivers; and averages the double differences. The gradient estimator module estimates a magnitude of the horizontal delay gradient based on the averaged compensated double-differences for the monitored satellite.

20 Claims, 7 Drawing Sheets

GROUND-BASED SYSTEM AND METHOD TO MONITOR FOR EXCESSIVE DELAY GRADIENTS

GOVERNMENT LICENSE RIGHTS

The U.S. Government may have certain rights in the present invention as provided for by the terms of Government Contract No. DTFAWA-03-D-03009 awarded by FAA.

BACKGROUND

The electron density of the ionosphere varies as a function of geographic location and time. The International Civil Aviation Organization (ICAO) is developing standards to address the threat to navigation and guidance systems in aircraft stemming from an ionosphere anomaly, i.e., extreme changes in electron density of the ionosphere. The standard development has shown it is critical that ground monitoring for delay gradients in signals due to an ionosphere anomaly is absolute and not relative to previous satellite measurements. It is important to detect an extreme gradient from the very first set of measurements taken from a satellite as it moves into view of a ground-based GPS augmentation system.

SUMMARY

The present application relates to a processing function to monitor a horizontal delay gradient in satellite signals. The processing function includes a satellite differencing module, a double differencing module, and a gradient estimator module. The satellite differencing module is configured to receive carrier phase measurements for at least two satellites from at least two reference receivers. The at least two satellites include a monitored satellite and at least one other satellite. The at least two reference receivers have a known geometric relationship to each other. The satellite differencing module determines differences in the carrier phase measurements between signals from the monitored satellite and at least one of the at least one other satellite. The double differencing module is configured to: form double-differences between one or more pairs of the at least two reference receivers based on the differences in the carrier phase measurements; compensate the double-differences between the pairs for the known difference-in-position of the reference receivers in the pairs; perform a modulo operation to limit the compensated double-differences to a range of minus one-half wavelength to plus one-half wavelength; for the monitored satellite, average the double differences over the other satellites among the at least two satellites. The gradient estimator module is configured to estimate a magnitude of the horizontal delay gradient based on the averaged compensated double-differences for the monitored satellite.

DRAWINGS

In accordance with common practice, the various described features are not drawn to scale but are drawn to emphasize features relevant to the present invention. Like reference characters denote like elements throughout figures and text.

DETAILED DESCRIPTION

The excessive delay gradient monitor is one of the most demanding monitors in a ground station. The excessive delay gradient monitor requires the carrier accuracy be held to millimeter levels. The horizontal delay gradient monitor described herein detects the horizontal component of a delay gradient affecting signals received at the ground station by comparing carrier phase measurements at three non-collinear reference receivers located in a horizontal plane. The horizontal component of the delay gradient lies within the plane in which the three non-collinear reference receivers are located. The horizontal delay gradient monitor also determines if the delay gradient is excessive. A delay gradient is excessive when the delay difference at a pair of reference receivers on a signal transmitted from a monitored satellite is greater (by more than a selected threshold) than the averaged delay difference on the signals transmitted from other satellites and simultaneously received at the same pair of reference receivers.

A minimum of two reference receivers are needed to measure a gradient in one direction. This configuration is useful for ground station installations that only require detection of delay gradients along a line. For example, the horizontal gradient monitor could include two reference receivers positioned along a line that is parallel to the direction of a landing strip. Such a horizontal gradient monitor is a "line-gradient monitor." A minimum of three non-collinear reference receivers are needed in a horizontal gradient monitor to measure a gradient along any line within the horizontal plane of the three non-collinear reference receivers.

If four or more reference receivers are available, redundant information is used to improve sensitivity to horizontal delay gradients. The terms "anomalous delay gradient," "delay gradient," "ionospheric delay gradient," and "horizontal delay gradient" are used interchangeably herein.

Figure 1:
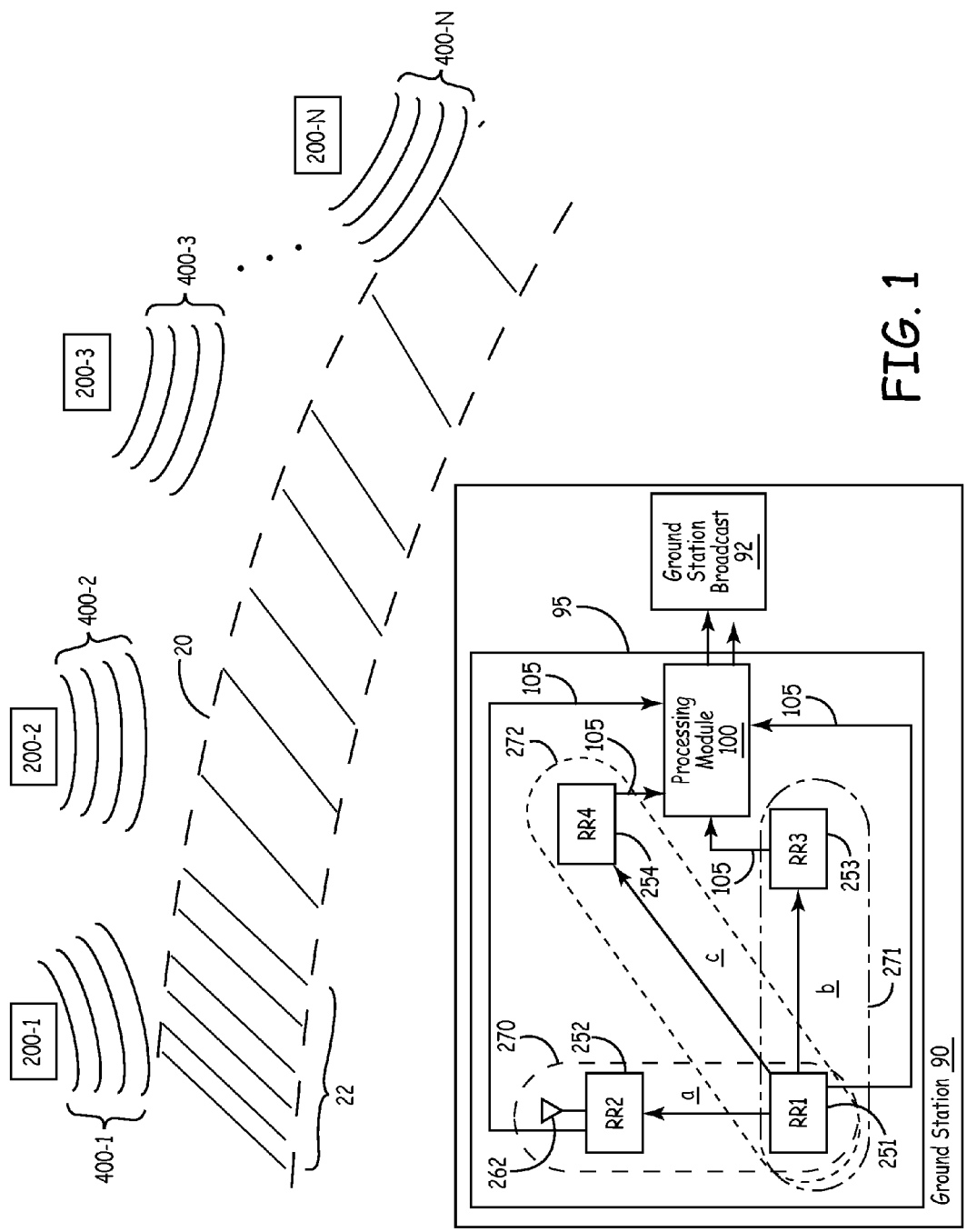
FIG. 1 shows an embodiment of a ground station to monitor for excessive delay gradients in satellite signals in accordance with the present invention.

FIG. 1 shows an embodiment of a ground station 90 to monitor for excessive delay gradients in satellite signals in accordance with the present invention. As shown in FIG. 1, the ground station 90 includes a horizontal delay gradient monitor 95 and a ground station broadcast 92. The ground station broadcast 92 is that portion of the ground station 90 that transmits signals to aircraft in the vicinity of the ground station 90. The horizontal delay gradient monitor 95 monitors for an excessive delay gradient present in the horizontal plane for signals 400-1 transmitted from a monitored satellite 200-1.

The horizontal delay gradient monitor 95 includes at least two reference receivers positioned in a known geometric relationship to each other and a processing function 100. The embodiment shown in FIG. 1 includes four reference receivers 251-254. The horizontal delay gradient has a horizontal component that lies in the plane that encompasses the four reference receivers 251-254. The processing function 100 is communicatively coupled to each of the reference receivers 251-254. During operation, the horizontal delay gradient monitor 95 receives signals from at least two satellites 200 (1-N). The reference receivers 251-254 are ground reference receivers 251-254 also indicated herein as "RR's."

The radio frequency signals 400(1-N) shown generally as phase fronts are emitted from the satellites 200(1-N), respectively (N is a positive integer). The radio frequency signals 400(1-N) propagate through the ionosphere generally represented by 20 to the ground station 90. The four reference receivers 251-254 receive radio frequency signals 400(1-N) from the monitored satellite 200-1 and from the other satellites 200(2-N). As is understood, each reference receiver 251-254 is a radio frequency receiver with an antenna, such as antenna 262 on reference receiver 252. Only one antenna 262 (seen on the second reference receiver 252) is shown for clarity of illustration.

There can be anomalous delay gradients 22 in the ionosphere 20 that affect the phase of the radio frequency signals that propagate through the anomalous delay gradient 22. The anomalous delay gradient 22 is indicated by an increased density of cross-hatching in the ionosphere 20. For example, as shown in FIG. 1, the radio frequency signal 400-1 from the monitored satellite 200-1 passes through the anomalous delay gradient 22 as it propagates toward the four reference receivers 251-254. The delay gradient 22 results in a horizontal gradient as the signal is received on the surface of the earth. This means that the ionospheric delay of the received signal changes as a receiver is moved on the surface of the earth.

The radio frequency signals 400(1-N) transmitted from the respective satellites 200(1-N) are sampled at approximately the same time at the reference receivers 251-254. A register (not shown) in the reference receivers 251-254 stores a number indicative of the instant carrier phase angle of the received $n^{th}$ satellite radio frequency signal 400-$n$, where n is a positive integer. The register is continuously updated for the radio frequency signals received from the $n^{th}$ satellites 200-$n$ in each of the reference receivers 251-254. The $n^{th}$ satellite radio frequency signal 400-$n$ is from one of the at least two satellites. An instant read out of the register is referred herein to as the "carrier phase measurement," or "instantaneous carrier phase measurement." The carrier tracking loops (not shown) in the reference receivers 251-254 estimate the resulting phase and Doppler errors and update such a register for each of the N satellites 200(1-N) in view of the reference receivers 251-254. The down conversion for each reference receiver is common to all the N satellites 200(1-N), thus the instantaneous carrier phase indicated by the register can be used to determine the relative phase between received satellite signals within the range of 0° to 360°. The relative phase is the phase relationship between signals transmitted from the at least two satellites and simultaneously received at the reference receivers 251-254. The relative phase is thus the difference in the carrier phase measurement between the signals transmitted from the at least two satellites that are simultaneously received at the reference receivers 251-254.

The known geometric relationship between the at least two reference receivers 251-254 is indicated by: vector a from the first reference receiver 251 to the second reference receiver 252; vector b from the first reference receiver 251 to the third reference receiver 253; and vector c from the first reference receiver 251 to the fourth reference receiver 254. Thus, the reference receivers in the pairs have a known difference-in-position versus the reference receiver 251 that is common to all the pairs 270-272. For example, vector a is the known difference-in-position of the reference receivers 251 and 252 that form the pair 270, vector b is the known difference-in-position of the reference receivers 251 and 253 that form the pair 271, and vector c is the known difference-in-position of the reference receivers 251 and 254 that form the pair 272.

The monitored satellite is that satellite for which a magnitude of the horizontal ionospheric delay gradient is monitored against a selected threshold. The first satellite 200-1 is being referred to as the monitored satellite 200-1 in this document, but it is to be understood that the ground station 90 can monitor ionospheric delay gradient to two or more of the N satellites 200(1-N). Thus, the software modules in the processing function 100 are executable to monitor two or more of the N satellites 200(1-N) so that two or more of the satellites 200(1-N) are monitored satellites. In embodiments, all the satellites 200(1-N) are monitored satellites 100(1-N).

In the embodiments described herein, the length of the vectors a, b, and c0 are small enough to avoid carrier phase ambiguities, which are caused by a cyclical repeat of the same phase relation. The allowable geometric relationship between the reference receivers relates to the wavelength of the received signal and the range of acceptable delay gradient. For an exemplary case, the wavelength λ, of the radio frequency signal transmitted by the satellites 200(1-N) is 19 cm. The delay gradients to be detected are within the range of −400 mm/km to +400 mm/km (i.e., 800 mm/km total range). The length of the vectors a, b, and c are in the range of 50 m to 200 m. In this exemplary case, the maximum carrier phase error $\delta x_c$=800 mm/km×0.2 km=16 cm, which is less than the wavelength of 19 cm. Thus, for this exemplary configuration of reference receivers 251-254, carrier phase ambiguities (caused by the repeat of the same phase relation at $\delta x_c$+19 cm) are avoided.

The reference receivers 251-254 are not driven by the same clock, so the reference phase generated in the receivers are not synchronized. If the reference receivers 251-254 were synchronized to a single clock, the reference phase would be identical and an anomalous gradient could be detected by comparing the register for a first satellite at a first reference receiver with the register for the first satellite at a second reference receiver. The embodiments of methods and systems described herein detect anomalous gradients when at least two unsynchronized reference receivers receive signals from at least two of the same satellites. An external reference is needed to simultaneously sample signals in unsynchronized reference receivers. For global navigation satellite systems, such as GPS, the satellite system time (such as GPS time) can be used as an external reference. As defined herein, signals that are sampled at the same time (or at substantially the same time) at unsynchronized reference receivers are "simultaneously received" or "substantially simultaneously received" at the unsynchronized reference receivers.

In one embodiment, the ground station 90 is a GBAS ground station 90. Although the ground station 90 described herein is for an airport landing system, this invention can be implemented in systems that require accurate input from a global positioning system satellite and is not limited for use with aircraft and/or ground stations for aircraft.

Figure 2:
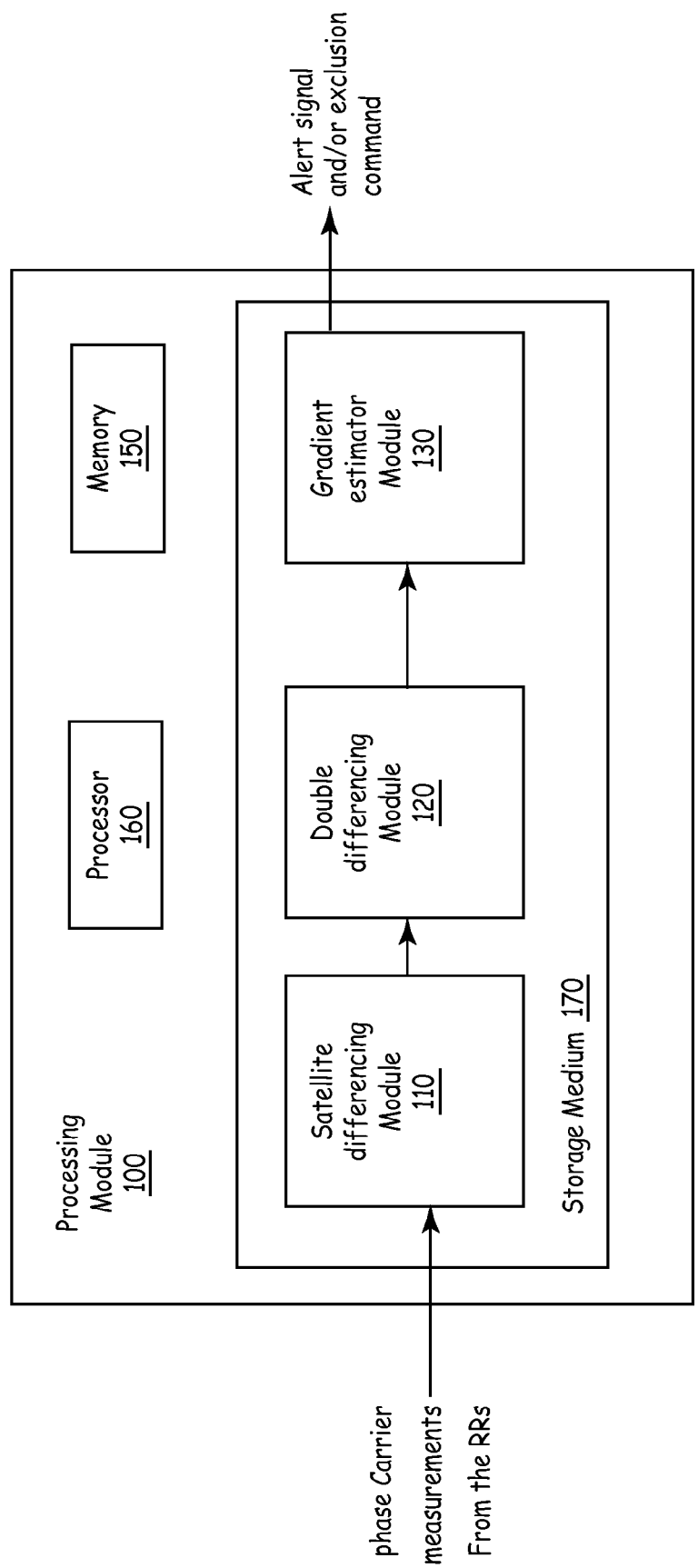
FIG. 2 shows an embodiment of a processing function in accordance with the present invention.

FIG. 2 shows an embodiment of a processing function 100 in accordance with the present invention. The processing function 100 includes a satellite differencing module 110, a double differencing module 120, a gradient estimator module 130, a memory 150, and at least one processor 160. The satellite differencing module 110, the double differencing module 120, and the gradient estimator module 130 are software modules stored in a storage medium 170. The satellite differencing module 110, the double differencing module 120, and the gradient estimator module 130 include computer readable medium encoded with computer instructions for performing the functions described herein. In one implementation of this embodiment, one or more of the satellite differencing module 110, the double differencing module 120, and the gradient estimator module 130 are the same module.

The satellite differencing module 110 is communicatively coupled to provide input to the double differencing module 120. The double differencing module 120 is communicatively coupled to provide input to the gradient estimator module 130. The processor 160 is communicatively coupled to execute software in the satellite differencing module 110, the double differencing module 120, and the gradient estimator module 130. The memory 150 is communicatively coupled to interface the satellite differencing module 110, the double differencing module 120, and the gradient estimator module 130 to each other as required to perform the functions described herein.

Memory 150 comprises any suitable memory now known or later developed such as, for example, random access memory (RAM), non-volatile memory, read only memory (ROM), and/or registers within the processor 160. The storage medium 170 comprises any storage device now known or later developed such as, for example, random access memory (RAM), non-volatile storage, read only memory (ROM). In one implementation, processor 160 comprises microprocessors or microcontrollers. Moreover, although the processor 160 and the memory 150 are shown as separate elements in FIG. 1, in one implementation, the processor 160 and memory 150 are implemented in a single device (for example, a single integrated-circuit device). In one implementation, the processor 160 comprises processor support chips and/or system support chips such as application-specific integrated circuits (ASICs).

Figure 3A:
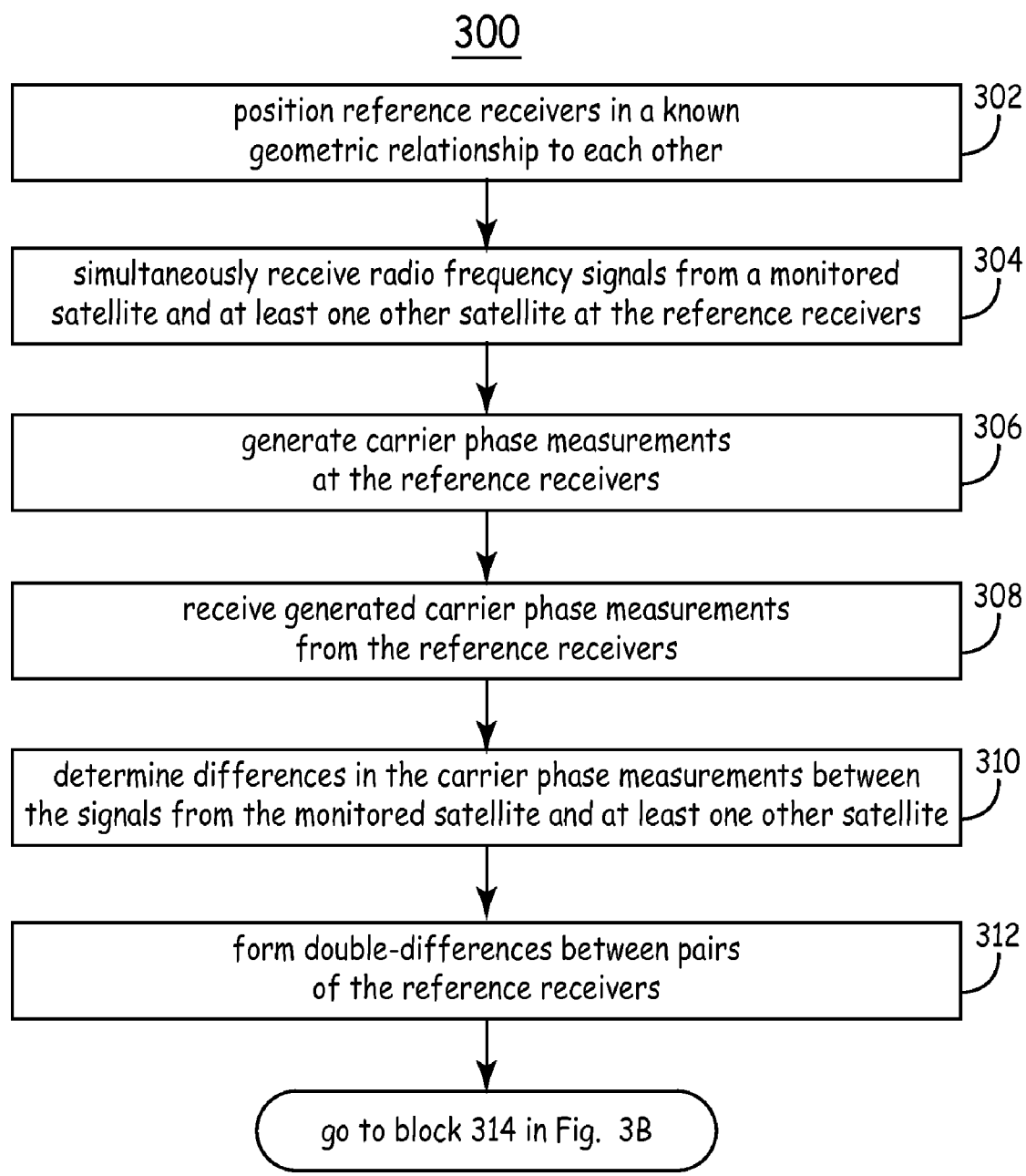
FIGS. 3A and 3B shows flowcharts representative of one embodiment of a method to monitor for excessive delay gradients in accordance with the present invention.
Figure 3B:
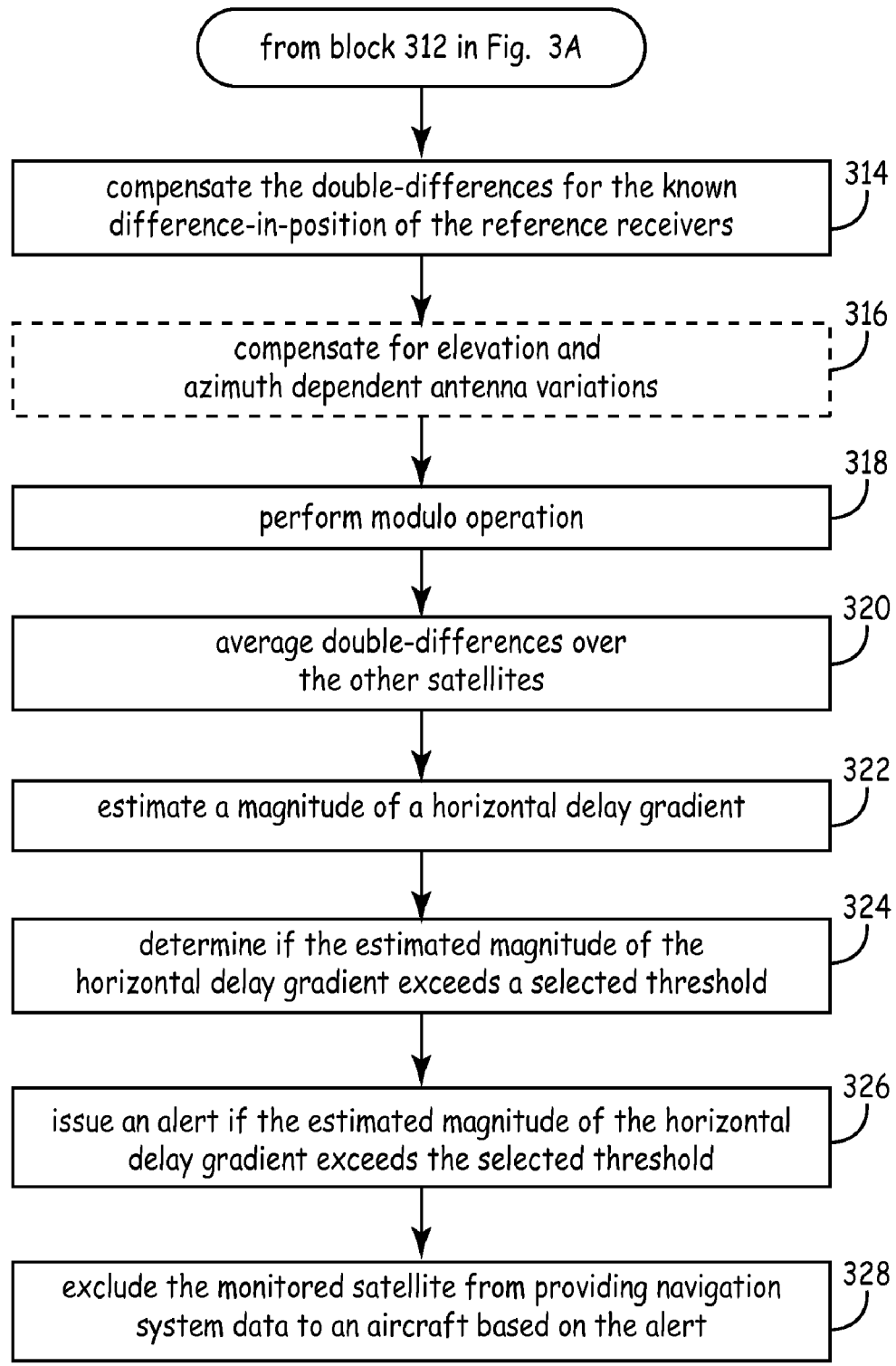

The implementation of the processing function 100 is now described in detail, with reference to FIGS. 3A and 3B. The method 300 is described for four reference receivers 251-254 using a subset of satellites 200(2-K) (K is an integer less than or equal to N) for comparison with the monitored satellite 200-1. The satellites 200(1-N) are in view of the reference receivers 251-254. As defined herein, a satellite is in view of a reference receiver if the radio frequency signals transmitted from the satellite are received by an antenna with sufficient power to be tracked in the reference receiver.

FIGS. 3A and 3B shows flowcharts representative of one embodiment of a method 300 to monitor for horizontal delay gradients caused by anomalous ionospheric delay gradients along the line of sight to a satellite from a ground reference receiver in accordance with the present invention. The method 300 is described with reference to the ground station 90 to monitor for ionospheric delay gradients such as shown in FIG. 1 and with reference to the processing function 100 shown in FIG. 2 although it is to be understood that method 300 can be implemented using other embodiments of the system as is understandable by one skilled in the art who reads this document.

At block 302, at least two reference receivers 251-254 are positioned in a known geometric relationship to each other. In one implementation of this embodiment, four reference receivers 251-254 are positioned in a known geometric relationship to each other. In another implementation of this embodiment, the four reference receivers 251-254 are positioned in proximity to the processing function 100. At block 304, radio frequency signals 400-1 and 400-2 are simultaneously received from the monitored satellite 200-1 and at least one other satellite 200-2 at the least two reference receivers 251-253. In one implementation of this embodiment, radio frequency signals 400(1-K) are simultaneously received from the respective monitored satellite 200-1 and the K−1 other satellites 200(2-K) at the four reference receivers 251-254 where K is an integer that is less than or equal to N. The reference receivers are able to determine which signal came from which satellite by a pseudorandom code specific to each satellite or by other data received from the satellite that is used to identify the satellite.

At block 306, the reference receivers 251-253 generate carrier phase measurements for the radio frequency signals 400-1 received from the monitored satellite 200-1 and for the radio frequency signals simultaneously received from another satellite 200-2. If there are four reference receivers 251-254 and K-1 other satellites 200(2-K) are being used in addition to the monitored satellite 200-1, then the reference receivers 251-254 generate carrier phase measurements for the radio frequency signal 400-1 received from the monitored satellite 200-1 and for radio frequency signals 400(2-K) simultaneously received from the K−1 other satellites 200(2-K). In one embodiment, all of the other satellites 200(2-N) are used to monitor the monitored satellite 200-1. The reference receivers 251-254 send information indicative of the generated carrier phase measurements to the processing function 100 via wireless or wired links 105 (FIG. 1).

At block 308, the satellite differencing module 110 of the processing function 100 receives the generated carrier phase measurements from at least two reference receivers 251-254.

At block 310, the satellite differencing module 110 determines differences in the carrier phase measurements between the signals from the monitored satellite and at least one other satellite. The carrier phase measurements are accepted at the satellite differencing module 110 from the at least two reference receivers. The satellite differencing module 110 determines differences in the carrier phase measurements between the radio frequency signals 400-1 received from the monitored satellite 200-1 at the reference receivers 251-254 and the radio frequency signals 400(2-K) received from at least a subset 200(2-K) of the other satellites at the reference receivers 251-254.

For example, the satellite differencing module 110 takes the difference between the instantaneous carrier phase measurement for the first satellite 200-1 at the first reference receiver 251 and the instantaneous carrier phase measurement for the second satellite 200-2 at the first reference receiver 251. The satellite differencing module 110 takes the difference between the instantaneous carrier phase measurement for the first satellite 200-1 at the second reference receiver 252 and the instantaneous carrier phase measurement for the second satellite 200-2 at the second reference receiver 252. The satellite differencing module 110 takes the difference between the instantaneous carrier phase measurement for the first satellite 200-1 at the third reference receiver 253 and the instantaneous carrier phase measurement for the second satellite 200-2 at the third reference receiver 253.

If there are three satellites 200(2-3) in the subset of other satellites, then the satellite differencing module 110 takes the difference between the instantaneous carrier phase measurement for the first satellite 200-1 at the first reference receiver 251 and the instantaneous carrier phase measurement for the third satellite 200-3 at the first reference receiver 251. The satellite differencing module 110 takes the difference between the instantaneous carrier phase measurement for the first satellite 200-1 at the second reference receiver 252 and the instantaneous carrier phase measurement for the third satellite 200-3 at the second reference receiver 252. The satellite differencing module 110 takes the difference between the instantaneous carrier phase measurement for the first satellite 200-1 at the third reference receiver 253 and the instantaneous carrier phase measurement for the third satellite 200-3 at the third reference receiver 253.

In this manner the satellite differencing module 110 establishes (K−1) differences $\delta\phi^m_{n,k}$ for each reference receiver, where "m" is the positive integer for the $m^{th}$ reference receiver, "n" is the positive integer for the $n^{th}$ commonly evaluated satellite (monitored satellite), and "k" is the positive-integer for the $k^{th}$ other satellite.

The satellite differencing module 110 determine the differences, which can be shown in a matrix format. When there are four satellites (including the monitored satellite) then the difference matrix for the first reference receiver 251 has the following form:

$$\begin{bmatrix} \delta\phi^1_{1,2} \\ \delta\phi^1_{1,3} \\ \delta\phi^1_{1,4} \end{bmatrix} \quad (1)$$

The satellite differencing module 110 likewise generates a difference matrix for the second reference receiver 252, which has the following form:

$$\begin{bmatrix} \delta\phi^2_{1,2} \\ \delta\phi^2_{1,3} \\ \delta\phi^2_{1,4} \end{bmatrix} \quad (2)$$

The satellite differencing module 110 likewise generates a difference matrix for the third reference receiver 253, which has the following form:

$$\begin{bmatrix} \delta\phi^3_{1,2} \\ \delta\phi^3_{1,3} \\ \delta\phi^3_{1,4} \end{bmatrix} \quad (3)$$

The satellite differencing module 110 likewise generates a difference matrix for the fourth reference receiver 254, which has the following form:

$$\begin{bmatrix} \delta\phi^4_{1,2} \\ \delta\phi^4_{1,3} \\ \delta\phi^4_{1,4} \end{bmatrix} \quad (4)$$

Thus, the satellite differencing module calculates (K−1) differences $\delta\phi$ for each reference receiver that provides input to the satellite differencing module 110, where K is the number of satellites in the subset. These differences reflect the relative phase within in 0° to 360° between the radio frequency signals 400(1-K) transmitted from the first satellites 200-1 and the other satellites in the subset 200(2-K). The rate of change in these differences relates to the Doppler variation, which is in the range −4000 m/s to +4000 m/s. The errors in the differences $\delta\phi$ caused by this rate of change set a limit on the timing accuracy between the different reference receivers 251-254. The satellite differencing module 110 sends the differences $\delta\phi^m_{n,k}$ to the double differencing module 120. The double differencing module 120 accepts the differences $\delta\phi^m_{n,k}$ from the satellite differencing module 110.

At block 312, the double differencing module 120 forms double differences ($d_{n,k}$) between pairs of the reference receivers 270, 271, and 272. The double differences for the first pair 270 is the difference in $\delta\phi^m_{n,k}$ between first reference receiver 251 and second reference receiver 252, which is mathematically represented as $$d_{n,k}[RR1,RR2]=\delta\phi^2_{n,k}-\delta\phi^1_{n,k}. \quad (5)$$

If there are four reference receivers and three other satellites for a monitored satellite, the double differences between the first pair 270 are obtained by subtracting equation (1) from equation (2) to obtain $d_{n,k}[RR1,RR2]=\delta\phi^2_{n,k}-\delta\phi^1_{n,k}$; the double differences between the second pair 271 are obtained by subtracting equation (1) from equation (3) to obtain $d_{n,k}[RR1,RR3]=\delta\phi^3_{n,k}-\delta\phi^1_{n,k}$; and the double differences between the third pair 272 are obtained by subtracting equation (1) from equation (4) to obtain $d_{n,k}[RR1,RR4]=\delta\phi^4_{n,k}-\delta\phi^1_{n,k}$.

The flow of method 300 proceeds from block 312 in FIG. 3A to block 314 in FIG. 3B. At block 314, the double differencing module 120 compensates the double-differences for the known difference-in-position of the reference receivers in the pairs. This compensation is a geometric compensation process in which the difference-in-position is projected on the line of sight to the satellite. The known geometric relationship of the common reference receiver 251 (in the pairs 270-272) to the other reference receivers 252-254 and the unit vector defining the line of sight are used in this step of the process. As described above, the known geometric relationship is indicated by vector a from the first reference receiver 251 to the second reference receiver 252; vector b from the first reference receiver 251 to the third reference receiver 253; and vector c from the first reference receiver 251 to the fourth reference receiver 254.

At block 316, the double differencing module 120 compensates for elevation and azimuth dependent antenna variations for the antennas associated with the respective at least two reference receivers 251-254. In one implementation of this embodiment, the double differencing module 120 uses a function series (such as spherical harmonics) to compensate for elevation and azimuth dependent antenna variations for the antennas. In another implementation of this embodiment, the double differencing module 120 uses tabulated numbers and interpolation to compensate for elevation and azimuth dependent antenna variations for the antennas. Block 316 is optional and in some embodiments there is no compensation for elevation and azimuth dependent antenna variations for the antennas associated with the respective reference receivers.

At block 318, the double differencing module 120 performs a modulo operation on the compensated double-differences. The modulo operation limits the phase to a range of minus one-half wavelength to plus one-half wavelength (±λ/2) by subtracting a whole number of wavelength.

At block 320, the double differencing module 120 averages the double-differences over the other satellites for the formed double-differences for the pairs 270, 271, and 272. The averaged double-differences for the first (monitored) satellite 200-1 with reference to the first pair 270 of reference receivers 251 and 252 is:

$$[d_1[RR1,RR2]=1/(K-1)\{d_{1,2}[RR1,RR2]+\ldots+d_{1,K}[RR1,RR2]\}. \quad (6)$$

The averaged double-difference for first (monitored) satellite 200-1 with reference to the second pair 271 of reference receivers 251 and 253 is:

$$[d_1[RR1,RR3]=1/(K-1)\{d_{1,2}[RR1,RR3]+\ldots+d_{1,K}[RR1,RR3]\}. \quad (7)$$

Likewise, the averaged double-differences for first (monitored) satellite 200-1 with reference to the third pair 272 of reference receivers 251 and 254 is:

$$[d_1[RR1,RR4]=1/(K-1)\{d_{1,2}[RR1,RR4]+\ldots+d_{1,K}[RR1,RR4]\}. \tag{8}$$

If more than one satellite 200(1-N) is being monitored, the averaged double-difference for a second monitored satellite (such as satellite 200-2) for the first pair 270 of reference receivers 251 and 252 is:

$$([d_2[RR1,RR2]=1/(K-1)\{d_{2,1}[RR1,RR2]+d_{2,3}[RR1,RR2]+\ldots+d_{2,K}[RR1,RR2]\} \tag{9}$$

and so forth, as is understandable to one skilled in the art upon reading and understanding this document. If the averaging is performed over all the other N−1 satellites, then the term (1-N) replaces (1-K) in the denominator of equations (6)-(9) and N replaces K in the sum.

In one implementation of this embodiment, the components of the sum in equations (6)-(9) are weighted by the phase noise 1σ, and the noise components do not all have the same weight as shown in equations (6)-(9). Most noise errors in the radio frequency signals 400(1-N) can be predicted based on standard multipath and thermal noise models.

In one embodiment, the double differencing module 120 also filters the double-differences to reduce noise content. In another embodiment, the double differencing module is further configured to average the compensated double-differences over time. In yet another embodiment, the double differencing module is configured to average the compensated double-differences over time and to filter the double-differences to reduce noise content.

The double differencing module 120 is communicatively coupled to provide input to the gradient estimator module 130. The input provided to the gradient estimator module 130 is the averaged, compensated (including modulo operation) double differences. The averaged, compensated double differences are accepted at the gradient estimator module 130. At block 322, the gradient estimator module 130 estimates a magnitude of the horizontal delay gradient resulting from the gradient 22 in the ionosphere 20 between the monitored satellite 200-1 and the pairs 170-172 of reference receivers 251-254. Horizontal delay gradients can also result from other anomalous signal conditions.

An embodiment of the algorithms executed by at least one processor 160 in the processing function 100 of the ground station 90 that are used to estimate the horizontal delay gradients for reference receivers 251-254 (i.e., for only three reference receivers) are now described. The subset of three reference receivers 251-253 is mathematically represented herein as {RR1, RR2, RR3}. The coordinate system (x, y) is in the tangent plane of the surface of the ground station in which the ground based system is located also herein referred to as the horizontal plane. The first reference receiver RR1 is at the origin of the (x, y) coordinate system. The second reference receiver RR2 is located at $\underline{a}^T=(ax, ay)$ and the third reference receiver RR3 is located at $\underline{b}^T=(bx, by)$ with respect to the first reference receiver RR1. The position gradient measurement matrix H (size 2×2) is written as:

$$H = \begin{bmatrix} \underline{a}^T \\ \underline{b}^T \end{bmatrix}. \tag{10}$$

The noise from each receiver is designated as $\{w_1, w_2, w_3\}$ for {RR1, RR2, RR3}. The measurement noise vector $\underline{w}$ (size 2×1) is:

$$\underline{w} = \begin{bmatrix} w_2 - w_1 \\ w_3 - w_1 \end{bmatrix}. \tag{11}$$

The measurement vector is $\underline{z}$ (size 2×1) so that:

$$\underline{z} = H\underline{G} + \underline{w}, \tag{12}$$

where G (size 2×1) is the true excessive gradient vector (to be measured by the gradient estimator module 130) and the averaged, compensated double differences in z are in meters as follows:

$$\underline{z} = \begin{bmatrix} d_n[RR2, RR1] \\ d_n[RR3, RR1] \end{bmatrix}. \tag{13}$$

The noise processes $\{w_1, w_2, w_3\}$ include thermal and broadband noise, multipath noise, residual antenna variation (after compensation), and normal gradients. The delay gradient in the tangent plane (x, y) is estimated based on the averaged, compensated double differences in $\underline{z}$. The noise vector $\underline{w}$ has correlated components. However each receiver specific noise is uncorrelated versus other reference receivers. The covariance of the noise, R, is then $$R = E[\underline{w}\,\underline{w}^T] \tag{14}$$

$$= E\left[\begin{bmatrix} w_2 - w_1 \\ w_3 - w_1 \end{bmatrix}[\,w_2 - w_1 \quad w_3 - w_1\,]\right]$$

$$= \begin{bmatrix} \sigma_2^2 + \sigma_1^2 & \sigma_1^2 \\ \sigma_1^2 & \sigma_3^2 + \sigma_1^2 \end{bmatrix},$$

where $\sigma_m^2$ is the 1σ noise variance at the $m^{th}$ reference receiver $RR_m$.

The mathematics for the horizontal delay gradient monitor 95 to monitor excessive delay gradient in an embodiment that has four reference receivers is now described. The set of four reference receivers 251-254 includes an additional fourth reference receiver 254 that is added to the three reference receiver system described above. The fourth reference receiver is located at $\underline{c}^T=(c_x, c_y)$. The position gradient measurement matrix H (size 3×2) is then $$\underline{z} = \begin{bmatrix} d_n[RR2, RR1] \\ d_n[RR3, RR1] \\ d_n[RR4, RR1] \end{bmatrix} \tag{15}$$

$$H = \begin{bmatrix} \underline{a}^T \\ \underline{b}^T \\ \underline{c}^T \end{bmatrix} \tag{16}$$

$$\underline{w} = \begin{bmatrix} w_2 - w_1 \\ w_3 - w_1 \\ w_4 - w_1 \end{bmatrix} \tag{17}$$

$$R = E[\underline{w}\,\underline{w}^T] \tag{18}$$

$$= E\left[\begin{bmatrix} w_2 - w_1 \\ w_3 - w_1 \\ w_4 - w_1 \end{bmatrix}[\,w_2 - w_1 \quad w_3 - w_1 \quad w_4 - w_1\,]\right]$$

$$= \begin{bmatrix} \sigma_2^2 + \sigma_1^2 & \sigma_1^2 & \sigma_1^2 \\ \sigma_1^2 & \sigma_3^2 + \sigma_1^2 & \sigma_1^2 \\ \sigma_1^2 & \sigma_1^2 & \sigma_4^2 + \sigma_1^2 \end{bmatrix} \quad (19)$$

In the case of an embodiment with two reference receivers the mathematics simplifies to a scalar measure.

$$z = \underline{a}^T \underline{G} + (w_2 - w_1)$$

A standard least-squares approximation for obtaining $\underline{G}$ requires that the noise components are uncorrelated. This condition is not met in this case. Thus, a generalized least-squares method that assumes that the noise components are correlated, is used to obtain an estimate of $\underline{G}$ denoted $\hat{\underline{G}}$, where $$\hat{\underline{G}} (H^T R^{-1} H)^{-1} H^T R^{-1} \underline{z}. \quad (20)$$

This formula requires that R be invertible, which it generally is. When the noise components are uncorrelated and equal (R=I) this expression reduces to the familiar least-squares solution.

$$\hat{\underline{G}} = (H^T H)^{-1} H^T \underline{z} \quad (21)$$

In the carrier measurement from the $m^{th}$ reference receiver $RR_m$ it is assumed that the receiver clock error was removed in the satellite differencing module. For each of the 1, ..., N satellites, the average over the carrier measurements from at least one other satellite is subtracted. The calculations are shown for averaging over a subset with K−1 satellites with the satellite index equal to indx(k) and indx(k)≠n.

The measured gradient in satellite n between the first and second reference receivers 251 and 252 is then:

$$\hat{G}_n[1, 2] = \quad (22)$$

$$\frac{1}{|\underline{a}|} d[1, 2] = \frac{1}{|\underline{a}|} \left[ \varphi_n^2 - \frac{1}{K-1} \sum_{k=1}^{K-1} \varphi_{indx(k)}^2 - \left( \phi_n^1 - \frac{1}{K-1} \sum_{k=1}^{K-1} \phi_{indx(k)}^1 \right) \right].$$

If there are gradients affecting other satellites 200(2-K), the measured gradient between the first and second reference receivers 251 and 252 (disregarding the noise) would be:

$$\hat{G}_n[1, 2] = [G_n[1, 2] - \frac{1}{K-1} \sum_{k=1}^{K-1} G_{index(k)}[1, 2] \quad (23)$$

When there are gradients on other satellites 200(2-K), the processing function 100 sees these other satellites 200(2-K) with a reduction factor of K−1. For example, when there are gradients affecting satellite n and n' then $$\hat{G}_n[1, 2] = [G_n[1, 2] - \frac{1}{K-1} G_{n'}[1, 2], \quad (24)$$

which is a relationship that can be used in support of exclusion of the affected satellite.

The noise in the measured gradient is $$w[1, 2] = \frac{1}{|\underline{a}|} [w_2 - w_1] \quad (25)$$

where $$w_m = w_n^m - \frac{1}{K-1} \sum_{k=1}^{K-1} w_{indx(k)}^m \quad (26)$$

is the carrier noise and the corresponding carrier noise sigma $\sigma_m$ is given by $$(\sigma_m)^2 = E[w_n^m \ w_n^m] + \frac{1}{(K-1)^2} \sum_{k=1}^{K-1} E[w_{indx(k)}^m \ w_{indx(k)}^m] \quad (27)$$

$$= (\sigma_n^m)^2 +$$

$$= \frac{1}{(K-1)^2} \sum_{k=1}^{K-1} (\sigma_{indx(k)}^m)^2$$

In this expression $\sigma_n^m$ is the measurement noise for satellite n on the $m^{th}$ reference receiver $RR_m$.

In this manner, the gradient estimator module 130 estimates the delay gradients $\hat{G}_n$. In the following, this principle is generalized to gradients in the horizontal plane (x,y). The covariance matrix P for the noise in $\hat{G}$ defines its properties $$\hat{\underline{G}} = (H^T R^{-1} H)^{-1} H^T R^{-1} \underline{z} \quad (28)$$

$$\underline{z} = H \underline{G} + \underline{w} \quad (29)$$

The noise part is:

$$\underline{W} = (H^T R^{-1} H)^{-1} H^T R^{-1} \underline{w} \quad (30)$$

$$P = E[\underline{W} \ \underline{W}^T] = (H^T R^{-1} H)^{-1} H^T R^{-1} E[\underline{w} \ \underline{w}^T] R^{-1} H (H^T R^{-1} H)^{-1} = (H^T R^{-1} H)^{-1} \quad (31)$$

Figure 4:
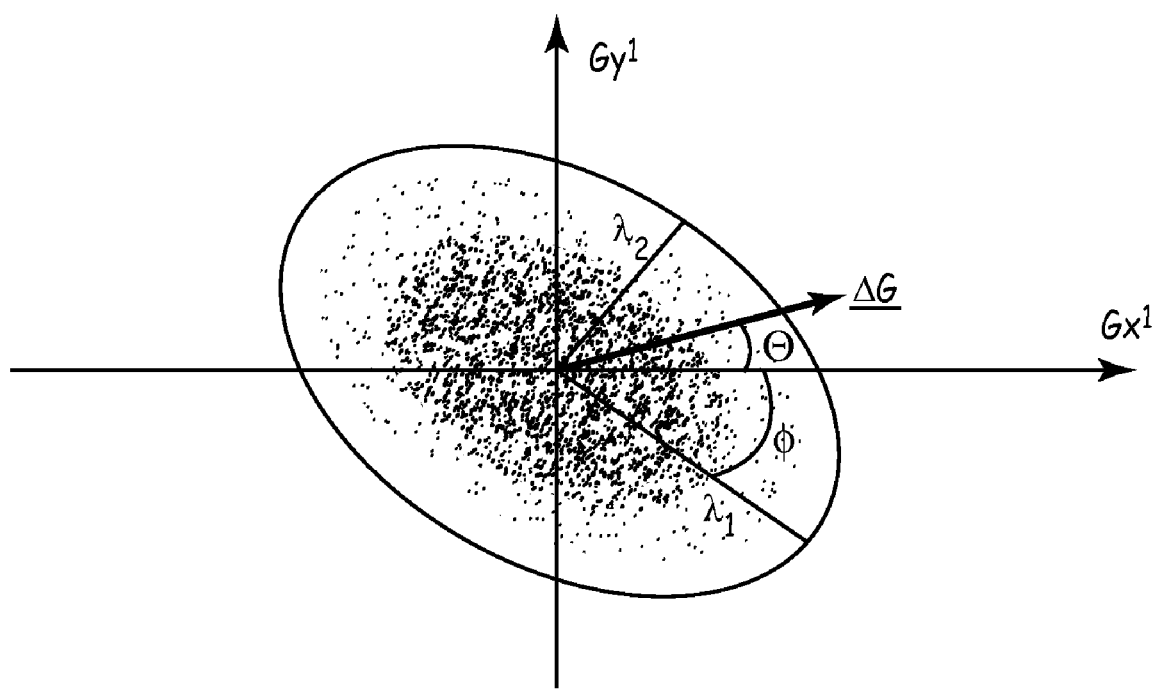
FIG. 4 shows the delay gradient free noise error distribution in an embodiment of the present invention.

FIG. 4 shows the anomalous delay gradient free error distribution in an embodiment of the present invention. The eigen-values of the matrix P, $\lambda_{max}$ and $\lambda_{min}$, yield the maximum and minimum variances in the 2-dimensional gradient space ($G_x$, $G_y$). For each possible configuration of reference receivers, the coordinate system (x', y') is changed to coincide with the major and minor axis. In this modified coordinate system:

$$P = \begin{bmatrix} \lambda_{max} & 0 \\ 0 & \lambda_{min} \end{bmatrix} = \begin{bmatrix} \sigma_{x'}^2 & 0 \\ 0 & \sigma_{y'}^2 \end{bmatrix} \quad (31)$$

Figure 5:
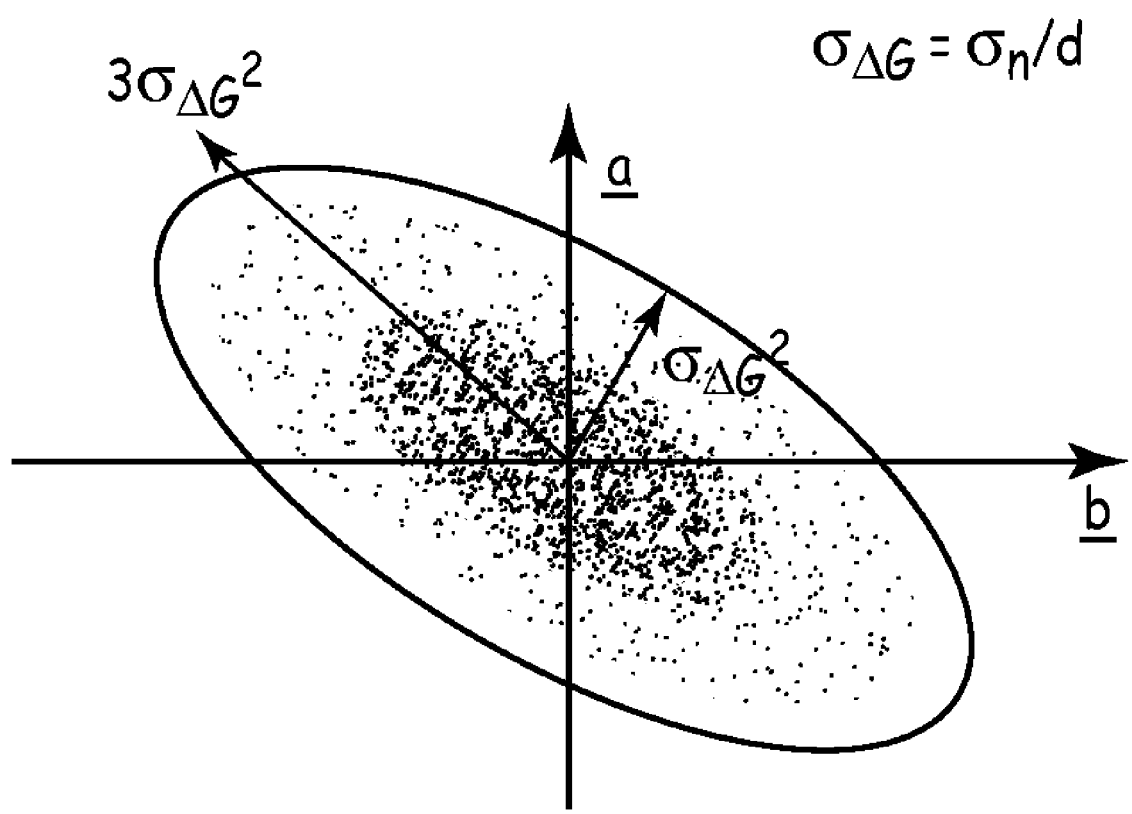
FIG. 5 shows the gradient noise error distribution for three reference receivers in an embodiment of the present invention.
Figure 6:
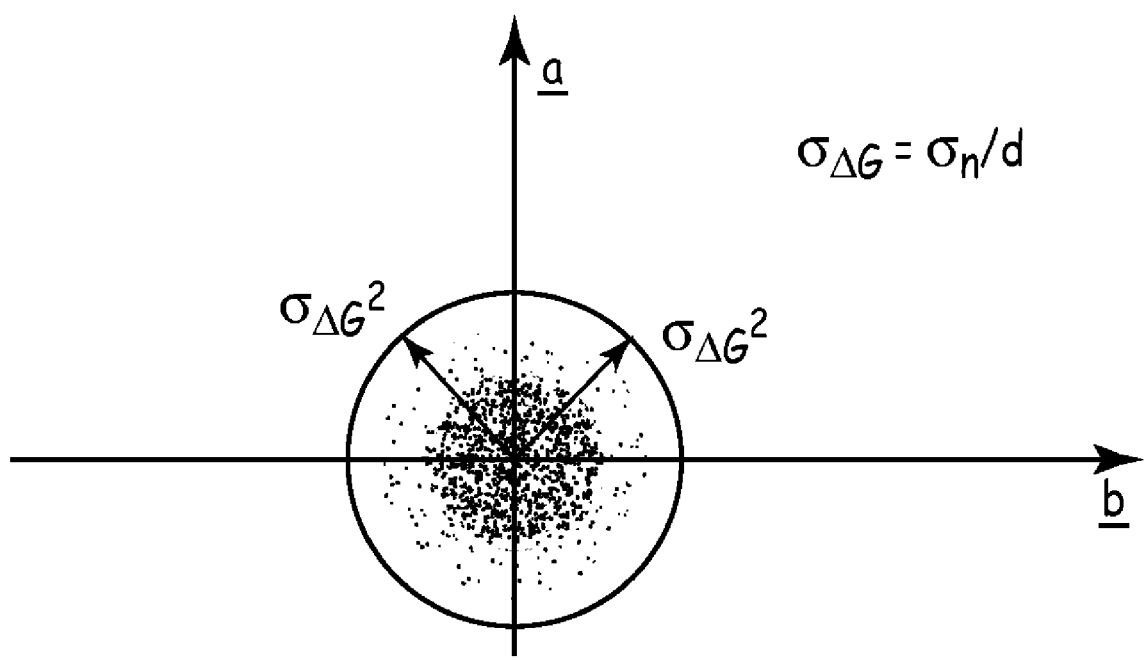
FIG. 6 shows a gradient noise error distribution for an embodiment of four reference receivers in accordance with the present invention.

FIG. 5 shows a gradient noise error distribution for three reference receivers in an embodiment of the present invention. FIG. 6 shows a gradient noise error distribution for an embodiment of four reference receivers in accordance with the present invention.

In order to form a magnitude discriminator D, the gradient estimate is scaled based on the σ's to make them have unit variance.

$$D = (G_{x'}, G_{y'}) \begin{bmatrix} \sigma_{x'}^2 & 0 \\ 0 & \sigma_{y'}^2 \end{bmatrix}^{-1} \begin{bmatrix} G_{x'} \\ G_{y'} \end{bmatrix} = G_{x'}^2/G_{x'}^2 + G_{y'}^2/\sigma_{y'}^2 \qquad (32)$$

This discriminator is $\chi^2$ distributed with 2 degrees of freedom and it is possible to set a threshold T based on a specific probability of false detection $p_{fd}$. Detection occurs if the magnitude discriminator D is greater than a selected threshold T (i.e., D>T).

At block 324, the gradient estimator module 130 determines if at least one of the estimated gradients $\hat{G}_n$ exceeds the selected threshold T. The selected threshold is stored in the memory 150 or the storage medium 170. The selected threshold is set high enough so that it is not exceeded by noise only. The noise may be different in different directions and this is considered when setting the threshold. When a gradient anomaly is present, the probability of a missed detection $p_{md}$ can be calculated by using the non-central $\chi^2$ distribution.

At block 326, the gradient estimator module 130 issues an alert if the estimated magnitude of the horizontal delay gradient exceeds the selected threshold. The alert can be an alert signal and/or an exclusion command. In one embodiment, an exclusion command is sent from the horizontal delay gradient monitor 95 to the ground station broadcast 92. In another embodiment, an alert signal is sent from the horizontal delay gradient monitor 95 to the ground station broadcast 92. In another embodiment, an alert signal is also sent from the horizontal delay gradient monitor 95 to the ground station 90 and the ground station 90 is communicatively coupled to a display to alert an air traffic controller based on the issuing of the alert.

At block 328, the ground station 90 takes steps to cease the broadcast or to exclude the affected monitored satellites from providing navigation system data to an aircraft (not shown) if at least one of the monitored satellites has an estimated gradient that exceeded the threshold. For example, the ground station broadcast 92 receives the exclusion command output from the gradient estimator module 130 and modifies the broadcast messages to the aircraft in the region to stop the aircraft from using the information from the monitored satellites which are experiencing the gradient anomaly. If necessary, the ground station 90 takes steps to cease the broadcast from the ground station broadcast 92 if at least one of the monitored satellites has an estimated gradient that exceeded the threshold.

There are simplifications of the mathematics shown above, some of which are obtained as follows:
1) set a fixed threshold based on the largest eigenvalue
2) If the two eigenvalues differ in magnitude, use a Gaussian approximation of the distribution.
3) If the two eigenvalues are equal in magnitude, set a fixed threshold based on the $\chi 2$ distribution.

The discriminator D is equivalently formulated as $$D = \underline{\hat{G}} P^{-1} \underline{\hat{G}} \qquad (33)$$

In one implementation of this embodiment, all the double differences are formed between the first reference receiver 251 and all other valid reference receivers 252-254 for all valid satellites 200(1-N) in view of the reference receivers 251-254. In another implementation of this embodiment, the double differences are formed between the first reference receiver 251 and all other valid reference receivers 252-254 for a subset 200(1-K) of the valid satellites 200(1-N), where K<N. In another embodiment, all the satellites 200(1-N) that are transmitting to the reference receivers 251-254 are monitored satellites and a subset of the other satellites are used as described herein to determine the horizontal delay gradient in the satellite signals from each of the monitored satellites. In yet another embodiment, all the satellites 200(1-N) that are transmitting to the reference receivers 251-254 are monitored satellites and all of the other satellites are used as described herein to determine the horizontal delay gradient in the satellite signals from the each of the monitored satellites.

In one embodiment, a weighted combination of the squared x-component and squared y-component is formed and compared to a second threshold. If the threshold is exceeded for one satellite (e.g., an $n^{th}$ satellite but no other satellite exceeds their second threshold, an anomaly has been detected in the $n^{th}$ satellite and the $n^{th}$ satellite is excluded from providing navigation data for an aircraft.

Embodiments of the systems and methods described herein can be used to reduce the threat to navigation systems in aircraft due to anomalous gradients in the electron density of the ionosphere.

Although specific embodiments have been illustrated and described herein, it will be appreciated by those skilled in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A processing function to monitor a horizontal delay gradient in satellite signals, the processing function comprising:
   a satellite differencing module configured to receive carrier phase measurements for at least two satellites from at least two reference receivers, the at least two satellites including a monitored satellite and at least one other satellite, wherein the at least two reference receivers have a known geometric relationship to each other, and wherein the satellite differencing module determines differences in the carrier phase measurements between signals from the monitored satellite and at least one of the at least one other satellite;
   a double differencing module configured to:
      form double-differences between one or more pairs of the at least two reference receivers based on the differences in the carrier phase measurements,
      compensate the double-differences between the pairs for the known difference-in-position of the reference receivers in the pairs,
      perform a modulo operation to limit the compensated double-differences to a range of minus one-half wavelength to plus one-half wavelength,
      for the monitored satellite, average the double differences over the other satellites among the at least two satellites; and
   a gradient estimator module configured to estimate a magnitude of the horizontal delay gradient based on the averaged compensated double-differences for the monitored satellite.

2. The processing function of claim 1, wherein the double differencing module is further configured to filter the compensated double-differences to reduce noise content.

3. The processing function of claim 1, wherein the double differencing module is further configured to average the compensated double-differences over time.

4. The processing function of claim 1, wherein the double differencing module is further configured to compensate for elevation and azimuth dependent antenna variations for antennas respectively associated with the at least two reference receivers.

5. The processing function of claim 1, wherein the gradient estimator module is further configured to compare the estimated magnitude of the delay gradient to a selected threshold.

6. The processing function of claim 1, further comprising:
a memory communicatively coupled to the satellite differencing module, the double differencing module, and the gradient estimator module.

7. A method of monitoring for a delay gradient to a monitored satellite, the method comprising:
receiving carrier phase measurements from at least two reference receivers, wherein the at least two reference receivers substantially simultaneously receive radio frequency signals from the monitored satellite and at least one other satellite;
determining differences in the carrier phase measurements between the signals from the monitored satellite and at least one other satellite for the at least two reference receivers;
forming double-differences between pairs of the at least two reference receivers;
compensating the double-differences for the known difference-in-position of the reference receivers in the pairs;
performing a modulo operation on the compensated double-differences to limit the compensated double-differences to a range of minus one-half wavelength to plus one-half wavelength;
averaging the compensated double differences over the at least one other satellites; and
estimating a magnitude of a horizontal delay gradient based on the averaged compensated double-differences.

8. The method of claim 7, further comprising:
determining if the estimated magnitude of the horizontal delay gradient exceeds a selected threshold.

9. The method of claim 8, further comprising:
issuing an alert if the estimated magnitude of the horizontal delay gradient exceeds the selected threshold.

10. The method of claim 9, further comprising:
excluding satellites from providing navigation system data to an aircraft based on the issuing of the alert.

11. The method of claim 8, further comprising:
excluding the monitored satellite from providing navigation system data to an aircraft if the estimated magnitude of the horizontal delay gradient exceeds the selected threshold.

12. The method of claim 7, further comprising:
positioning at least two reference receivers in a known geometric relationship to each other.

13. The method of claim 7, further comprising:
averaging the averaged compensated double-differences over time.

14. The method of claim 7, further comprising:
filtering the averaged compensated double-differences to reduce noise.

15. The method of claim 7, further comprising:
compensating for elevation and azimuth dependent antenna variations for antennas associated with the respective at least two reference receivers.

16. A ground based system to monitor for a horizontal delay gradient to a monitored satellite, the system comprising:
at least two reference receivers positioned in a known geometric relationship to each other, the at least two reference receivers configured to substantially simultaneously receive radio frequency signals from the monitored satellite and at least one other satellite; and
a processing function communicatively coupled to the at least two reference receivers, the processing function configured to:
receive carrier phase measurements for the monitored satellite and at least one other satellite from the at least two reference receivers,
determine differences in the carrier phase measurements between the signals transmitted from the monitored satellite and at least one other satellite and substantially simultaneously received at the at least two reference receivers,
form double-differences between pairs of the at least two reference receivers based on the differences in the carrier phase measurements,
compensate the double-differences for the known difference-in-position of the reference receivers in the pairs,
perform a modulo operation to limit the compensated double-differences to a range of minus one-half wavelength to plus one-half wavelength,
average the compensated double-differences over the other satellites for the monitored satellite at the pairs, and
estimate a magnitude of the horizontal delay gradient based on the averaged compensated double-differences.

17. The ground based system of claim 16, wherein the processing function further comprises:
a satellite differencing module to accept the carrier phase measurements from the at least two reference receivers;
a double differencing module to accept the differences in the carrier phase measurements from the satellite differencing module; and
a gradient estimator module to accept the averaged double-differences from the double differencing module and to compare the magnitude of the estimated delay gradient for the monitored satellite to a selected threshold.

18. The processing function of claim 16, wherein the double differencing module is further configured to filter the compensated double-differences to reduce noise.

19. The processing function of claim 16, wherein the double differencing module is further configured to compensate for elevation and azimuth dependent antenna variations for antennas associated with the respective at least two reference receivers.

20. The processing function of claim 16, wherein the gradient estimator module is further configured to output at least one of an alert signal or exclusion command when the magnitude of the estimated delay gradient exceeds a selected threshold.

* * * * *

UNITED STATES PATENT AND TRADEMARK OFFICE
CERTIFICATE OF CORRECTION

PATENT NO. : 8,094,064 B2  
APPLICATION NO. : 12/717254  
DATED : January 10, 2012  
INVENTOR(S) : Brenner Page 1 of 1

It is certified that error appears in the above-identified patent and that said Letters Patent is hereby corrected as shown below:

In the Claims

Claim 18, Column 16, Line 46, replace "processing function" with --ground based system--.

Claim 18, Column 16, Line 46, replace "claim 16" with --claim 17--.

Claim 19, Column 16, Line 49, replace "processing function" with --ground based system--.

Claim 19, Column 16, Line 49, replace "claim 16" with --claim 17--.

Claim 20, Column 16, Line 54, replace "processing function" with --ground based system--.

Claim 20, Column 16, Line 54, replace "claim 16" with --claim 17--.

Signed and Sealed this  
Twenty-seventh Day of May, 2014

Michelle K. Lee  
*Deputy Director of the United States Patent and Trademark Office*